(12) United States Patent
Garg et al.

(10) Patent No.: US 7,730,449 B2
(45) Date of Patent: Jun. 1, 2010

(54) AUTO REFERENCE COUNTING POINTER FOR C++ OBJECTS WITH ABILITY TO RE-CAST AND LOOKUP FROM A FREE POINTER

(75) Inventors: Man M. Garg, Cerritos, CA (US); Andrey I. Savov, Laguna Hills, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 2128 days.

(21) Appl. No.: 10/391,828

(22) Filed: Mar. 19, 2003

(65) Prior Publication Data
US 2004/0187098 A1 Sep. 23, 2004

(51) Int. Cl.
*G06F 9/44* (2006.01)
*G06F 9/45* (2006.01)

(52) U.S. Cl. ............... 717/116; 717/108; 717/121; 717/151; 717/153

(58) Field of Classification Search ............ 717/108, 717/122; 719/310; 707/100
See application file for complete search history.

(56) References Cited

U.S. PATENT DOCUMENTS

| | | | |
|---|---|---|---|
| 5,649,200 A * | 7/1997 | Leblang et al. | ............ 717/122 |
| 5,900,001 A | 5/1999 | Wolczko et al. | |
| 5,903,900 A | 5/1999 | Knippel et al. | |
| 5,911,144 A | 6/1999 | Schwartz et al. | |
| 5,915,255 A | 6/1999 | Schwartz et al. | |
| 5,918,235 A | 6/1999 | Kirshenbaum et al. | |
| 5,948,113 A | 9/1999 | Johnson et al. | |
| 6,049,810 A | 4/2000 | Schwartz et al. | |
| 6,094,664 A | 7/2000 | Ungar | |
| 6,115,782 A | 9/2000 | Wolczko et al. | |
| 6,125,434 A | 9/2000 | Willard et al. | |
| 6,144,965 A * | 11/2000 | Oliver | ............ 707/100 |
| 6,167,535 A | 12/2000 | Foote et al. | |
| 6,173,421 B1 | 1/2001 | Johnson et al. | |
| 6,839,726 B2 * | 1/2005 | Kawamoto | ............ 707/206 |
| 2003/0140071 A1 * | 7/2003 | Kawamoto | ............ 707/206 |
| 2003/0196063 A1 * | 10/2003 | Garst et al. | ............ 711/170 |

* cited by examiner

*Primary Examiner*—Tuan Q Dam
*Assistant Examiner*—Isaac T Tecklu
(74) *Attorney, Agent, or Firm*—Tucker Ellis & West LLP

(57) ABSTRACT

A self reference-counting pointer that keeps the reference count of the object within the pointer-object that does not impose any restrictions on the object itself and can be used freely on objects already created. A reference count object is created and is attached to a pointer-object of the object when the first instance of the object is created. When subsequent references or copies of the object are made, the reference count is incremented, and the pointer object associated with the subsequent reference or copy of the object are attached to the reference count object. When any instance of the object goes out of scope, the pointer-object to that instance is detached from the reference count object and the reference count is decremented. When there are no instances of the object attached to the reference counter, then the reference counter is deleted.

22 Claims, 2 Drawing Sheets

AUTO REFERENCE COUNTING POINTER FOR C++ OBJECTS WITH ABILITY TO RE-CAST AND LOOKUP FROM A FREE POINTER

COPYRIGHT OR MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

This invention relates generally to referencing objects in a programming environment and more specifically to managing objects.

Two common problems which occur in object oriented programming languages such as C++, are memory leaks and dangling pointers. A memory leak occurs when memory space is allocated for an object but never released after use. A dangling pointer points to a destroyed object or freed memory region. After an object is dynamically destroyed, any subsequent attempt to reference the destroyed object using the dangling pointer can have unpredictable and often disastrous results. For instance, if a reference to a destroyed object is used, the memory space can become corrupt and potentially cause the computer program, and perhaps the computer itself, to crash. These problems become even more pronounced in multi-threaded applications, particularly applications where an object has "suicide" methods (methods where an object will delete itself).

The C++ language allows objects to be constructed on the heap at runtime. These objects have to be deleted by the creating module or some other module when they are no longer required. However, this explicit object deletion can cause the two aforementioned common problems. First, if the object does not get deleted, this causes memory leaks making the program consume memory and starve other applications of memory. Second, if the objects are deleted too soon while some other module or thread still holds a pointer to the object, it will cause a crash when these pointers are used.

Existing solutions depend on the object to provide functionality to keep the reference count. This imposes restriction on the object makes the reference counting pointer not usable for any existing type of object. Referring to FIG. 1, there is shown a typical prior art solution The real object 102 contains the reference count 104 of the pointer object 106. The reference count 104 is kept and managed by the real object 102. Typically, the below code must be implemented by each real object to sue the smart pointer by way of inheritance from a common class or in the object itself.

```
class RealObject {
    int m_refCount;
public:
    RealObject( ):m_refCount(0){}
    AddRef( )
    {
        m_refCount++;
    }
    Release( )
    {
```
-continued
```
        m_refCount--;
        if(m_refCount == 0)
            delete this;
    }
}
```

If a member function has to return the 'this' pointer, then the implementation must call AddRef( ) before returning the 'this' pointer. For example:

```
PointerOjbect GetObjectPtr( )
{
    AddRef( );    // must be called to correct reference count.
    return this;
}
```

It should be noted that there is a 'delete this' in the Release( ) function. This is not legal in some compilers.

Many prior efforts result in the creation of pointer-objects that will allow the keeping a count of the object references held by modules and threads. These pointer-objects also delete the object when the last reference is released. However, there are two main drawbacks to these efforts. First, these pointer-objects impose implementation restrictions on the object and force the object itself to keep the reference count or inherit the count from a base object. This makes the pointer-object unusable to an existing real object. Also, case has to be taken to increment the reference count manually when handing out the object reference from within the object ('this' pointer). second, these pointers cannot be cast to other object pointers, thus losing the true nature of the pointer.

Thus the needs exists for a self-reference counting pointer that keeps the reference count of the object within the pointer object.

BRIEF SUMMARY OF THE INVENTION

In view of the aforementioned needs, the invention contemplates a self reference-counting pointer that keeps the reference count of the object within the pointer-object. The present invention does not impose any restrictions on the object itself and can be used freely on objects already created. The present invention also implements lookup of the pointer-object from a raw pointer making it keep a correct reference count when a 'this' pointer is handed out. The present invention also implements implicit safe casting of an object without losing the reference count for the correct type of object.

One aspect of the present invention is a method for using a computer to manage an object, comprising the steps of creating a reference count object and attaching the reference count object to a pointer-object of the object. Normally the creating step occurs by referencing the object. The reference counter is created when the first instance of the object is created, ordinarily when a first reference to the object is made. When subsequent references or copies of the object are made, the reference count is incremented, and the pointer object associated with the subsequent reference or copy of the object are attached to the reference count object. When any instance of the object goes out of scope, the pointer-object to that instance is detached from the reference count object and the reference count is decremented. When there are no instances of the object attached to the reference counter, (i.e when the last reference to the object goes out of scope) then the reference counter is deleted.

Another aspect of the present invention is a method for using a computer to manage an object, comprising the steps of creating a base object comprising a base pointer object, creating a reference count object, attaching the reference count object to the base pointer object, deriving a new object from the base object, the base object comprising a new base pointer object, incrementing the reference count object each time a new instance of the derived object is created, and attaching the new base pointer object to the reference count object. When the base object is deleted, the base pointer object is detached from the reference count object and the reference count object is decremented. If there are other objects, either base or derived, attached to the reference count object, then the reference count object is not deleted. When the new object is deleted, the new pointer object is detached from the reference count object and the reference count object is decremented. When there are no more pointer objects attached to the reference count object (of base type and derived type), then the reference count object is deleted.

Other aspects of the present invention comprise a computer readable storage medium for encoding program code for performing the aforementioned methods.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention. In the drawings.

DETAILED DESCRIPTION OF INVENTION

Throughout this description, the preferred embodiment and examples shown should be considered as exemplars, rather than limitations, of the present invention.

The present invention removes the need for C++ developers to keep accurate track of all of the objects constructed on the heap by keeping a reference count (the number of modules referencing the object) and deleting the object when nothing is referencing it. The pointer-object is designed to work in a manner a normal C++ pointer works so that the developers continue using the pointer-object in place of a C++ pointer without observing any difference.

The present invention creates a reference count object on the fly when the first reference to an object is made and attached it to a pointer-object. As pointer-objects are handed over and copied, like a normal pointer, the reference count is automatically updated by the pointer-object constructor. Also when the pointer object goes out of scope, the reference count is decremented. When the last pointer-object goes out of scope, the real object is deleted. At this time the reference count object is also deleted.

The present invention allows the object to handout its own pointer (like a 'return this'). The present invention provides a mechanism to lookup the reference counting object from the raw pointer and correctly increments the reference count along with attaching the reference counting object to the returned pointer-object. This avoids one of the main problems of prior art reference counters, that of object returning a pointer of self (called 'this' pointer) without taking care of the reference count. The code for the Real object is similar to that of the prior art, for example:

```
class RealObject {
... functional code ...
}
```

However, it should be noted that unlike the prior art, the RealObject does not have a counter and does not contain code for incrementing and decrementing a counter. The PointerObject is implemented as a template, such as tyepdef PointerObject <RealObject> RealObjectPtr;

Also, a member function returning the 'this' pointer do not have to take care of the reference count and the implementation remains the same as if the pointer was an actual RealObject, for example the language pointer.

```
RealObjectPtr GetObjectPtr( )
{
    return this;
}
```

Thus, the ObjectPointer of the present invention can be used exactly the same as a C++ language pointer and relieves users from the responsibility of deleting the object at the right time.

Figure 1:
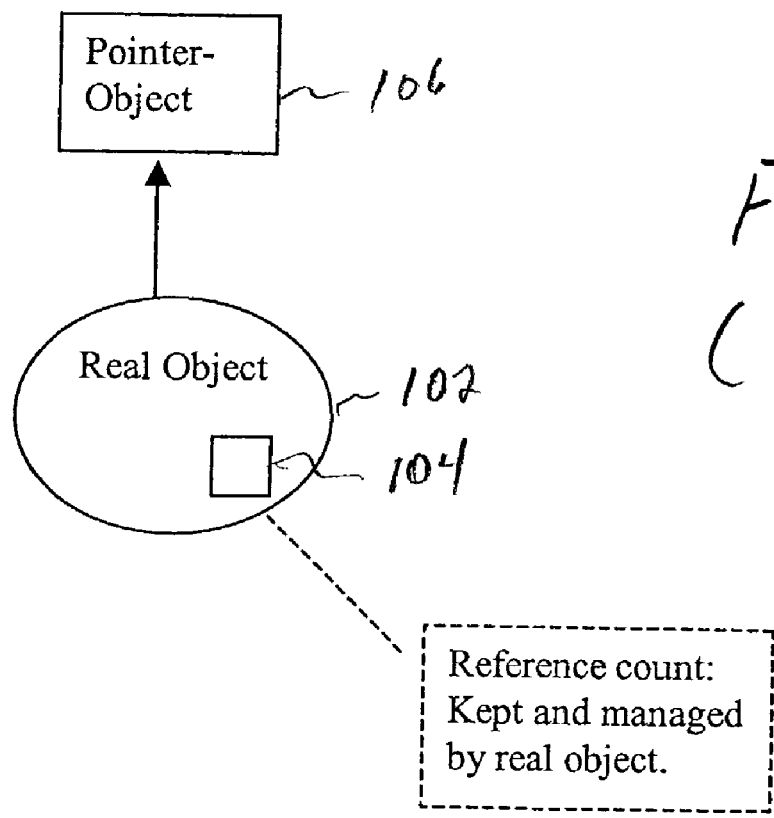
FIG. 1 is a block diagram of a typical prior art method for handling objects.
Figure 2:
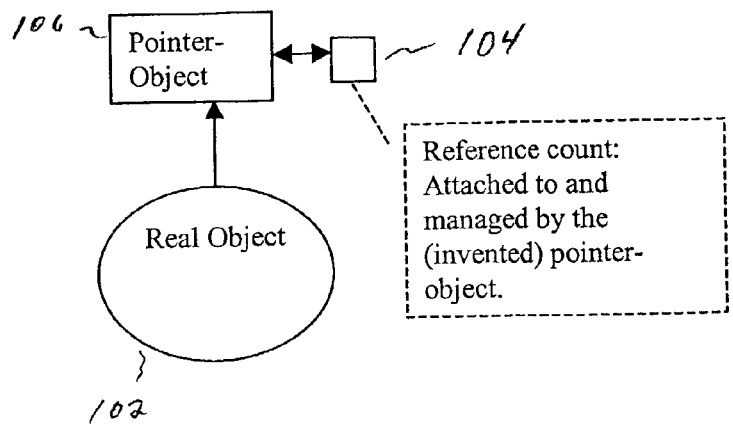
FIG. 2 is a block diagram illustrating the relationships between a real object, pointer object, and reference counter as contemplated by the present invention.

Referring to FIG. 2 there is a block diagram illustrating the interconnection of the components as contemplated by the present invention. The real object 102 is connected to the pointer object 106. The pointer object 106 is connected to the reference counter 104. The reference counter 104 is attached to and managed by the invented pointer object 106.

Figure 3:
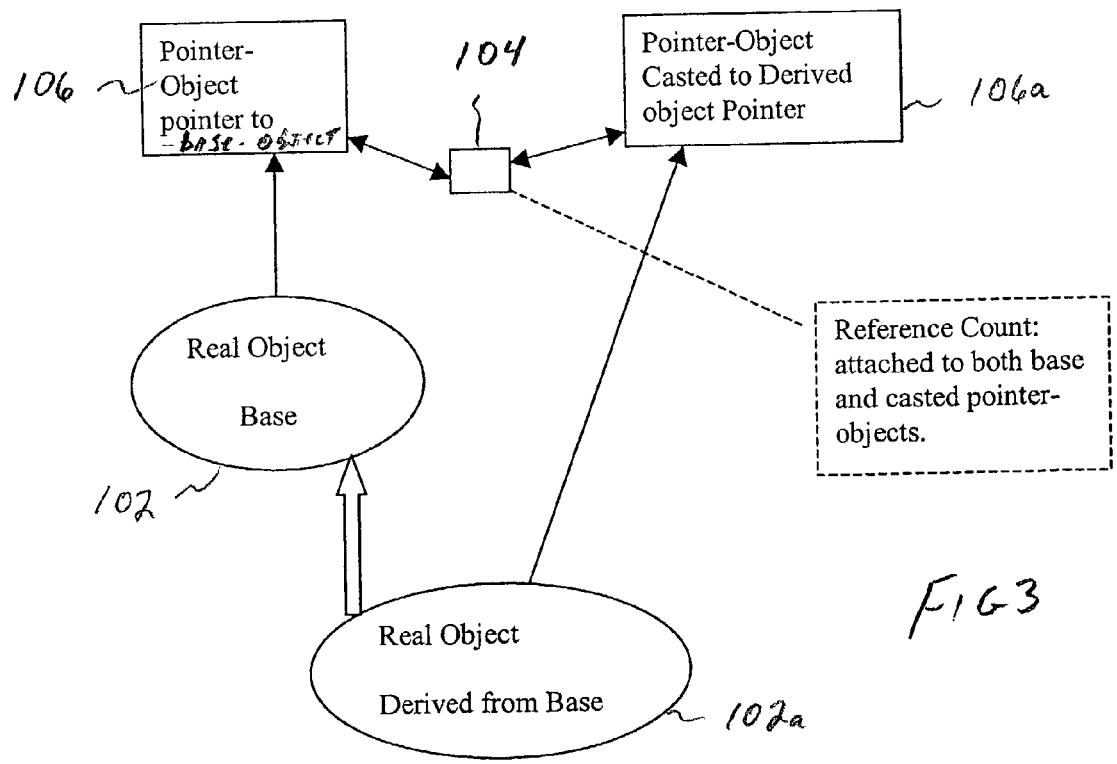
FIG. 3 is a block diagram illustrating the relationships between real objects, pointer objects, and reference counter for multiple objects as contemplated by the present invention

Referring now to FIG. 3 there is a block diagram illustrating an arrangement of components when objects are derived from a real object and instance of the derived object is referenced by using pointer to base object or pointer to derived object. A pointer-object to base (106) is created when first reference to object is made along with reference counter 104. The pointer-object 106 is attached to the reference counter 104. Whenever a new reference to the derived real object 102a is made, a new pointer object 106a is also created and casted to the derived object 102a. The new pointer object 106a is also attached to the reference counter 104 Unlike when the base object 102 is created, a new reference counter is not created, but instead the already existing reference counter is incremented. As either the base object 102, or the new real object 102a are deferenced the associated pointer-object, 106 or 106a respectively, is detached from the reference counter 104 and the reference counter is decremented. Whenever there are no pointer-objects attached to the reference counter, then the reference counter is deleted along with the Real Objects The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method for using a computer to manage an object in a software environment, comprising the steps of:
   creating a reference count object upon a first reference to an associated real object;
   attaching the reference count object to a pointer object associated with the real object;
   directing a pointer lookup request to the reference count object in accordance with a location specified by a free pointer;
   incrementing a reference count value associated with the reference count object upon each occurrence of a reference to and a derivative of the real object;
   attaching a reference count object to each derivative of the real object;
   detaching each reference count object from each reference and to a derivative of the real object when it goes out of scope;
   decrementing the reference count value each time an instance of the reference count object goes out of scope; and
   deleting a final reference count object when a last count object instance goes out of scope, wherein the object is a base object, the pointer object is a base pointer object, and the base object comprises a pointer object constructor, the steps further comprising:
   deriving a derived object from the base object;
   casting a second pointer object casted to the derived object;
   attaching the second pointer object to the reference count object; and
   incrementing the reference count object.

2. The method of claim 1, the creating step further comprising referencing the object.

3. The method of claim 1 wherein the creating step occurs when a first reference to the object is made.

4. The method of claim 1 further comprising:
   dereferencing the derived object;
   deleting the second pointer object; and
   decrementing the reference count object.

5. The method of claim 4 further comprising:
   dereferencing the base object;
   deleting the base pointer object; and
   deleting the reference count object and the base object.

6. The method of claim 1 further comprising:
   dereferencing the base object;
   deleting the base pointer object; and
   decrementing the reference count object.

7. The method of claim 6 further comprising:
   dereferencing the derived object;
   deleting the second pointer object; and
   deleting the reference count object and the derived object.

8. A method for using a computer to manage an object, comprising the steps of:
   creating a base object comprising a base pointer object upon a first reference to an associated real object;
   creating a reference count object upon a first reference to the associated real object;
   attaching the reference count object to the base pointer object;
   deriving at least one new object from the base object;
   generating a new base pointer object for each new object;
   incrementing the reference count object each time a new object is derived;
   attaching the new base pointer object to the reference count object;
   detaching each reference count object from each reference and to a derivative of the real object when it goes out of scope;
   decrementing the reference count value each time an instance of the reference count object goes out of scope; and
   deleting a final reference count object when a last count object instance goes out of scope, wherein the object is a base object, the pointer object is a base pointer object, and the base object comprises a pointer object constructor, the steps further comprising:
   deriving a derived object from the base object;
   casting a second pointer object casted to the derived object;
   attaching the second pointer object to the reference count object; and
   incrementing the reference count object.

9. The method of claim 8, the steps further comprising:
   dereferencing the base object and detaching the base pointer object from the reference count object; and
   decrementing the reference count object.

10. The method of claim 8, the steps further comprising:
    dereferencing the new object and detaching the new pointer object from the reference count object; and
    decrementing the reference count object.

11. The method of claim 8, the steps further comprising:
    dereferencing the base object and detaching the base pointer object from the reference count object;
    decrementing the reference count object;
    deleting the new object and detaching the new pointer object from the reference count object;
    decrementing the reference count object; and
    deleting the reference count object.

12. A computer readable storage medium for encoding program code for managing an object, comprising:
    instructions for creating a reference count object;
    instructions for attaching the reference count object upon a first reference to an associated real object to a pointer object associated with the real object;
    instructions for directing a pointer lookup request to the reference count object in accordance with a location specified by a free pointer;
    instructions for incrementing a reference count value associated with the reference count;
    object upon each occurrence of a reference to and a derivative of the real object;
    instructions for attaching a reference count object to each derivative of the real object;
    instructions for detaching each reference count object from each reference and to a derivative of the real object when it goes out of scope;

instructions for decrementing the reference count value each time an instance of the reference count object goes out of scope; and instructions for deleting a final reference count object when a last count object instance goes out of scope, wherein the object is a base object, the pointer object is a base pointer object, and the base object comprises a pointer object constructor, the steps further comprising:

instructions for deriving a derived object from the base object;

instructions for casting a second pointer object casted to the derived object;

instructions for attaching the second pointer object to the reference count object; and instructions for incrementing the reference count object.

13. The computer readable storage medium of claim 12 further comprising instructions for referencing the object.

14. The computer readable storage medium of claim 12 wherein the instructions for creating a reference count object execute when a first reference to the object is made.

15. The computer readable storage medium of claim 12 further comprising:

instructions for dereferencing the derived object;
instructions for deleting the second pointer object; and
instructions for decrementing the reference count object.

16. The computer readable storage medium of claim 15 further comprising:

instructions for dereferencing the base object;
instructions for deleting the base pointer object; and
deleting the reference count object.

17. The computer readable storage medium of claim 12 further comprising:

instructions for dereferencing the base object;
instructions for deleting the base pointer object; and
decrementing the reference count object.

18. The computer readable storage medium of claim 17 further comprising:

instructions for dereferencing the derived object;
instructions for deleting the second pointer object; and
instructions for deleting the reference count object.

19. A computer readable storage medium for using a computer to manage an object, comprising the steps of:

instructions for creating a base object comprising a base pointer object upon a first reference to an associated target object;

instructions for creating a reference count object associated with the target object;

instructions for attaching the reference count object to the base pointer object;

instructions for deriving a new object from the base object;

instructions for generating a new base pointer object for each derived new object;

instructions for incrementing the reference count object each time a new object is derived;

instructions for attaching the new base pointer object to the reference count object;

instructions for detaching each instance of the reference count object from each reference and copy of the target object when it goes out of scope;

instructions for decrementing the reference count value each time an instance of the reference count object goes out of scope; and instructions for deleting a final reference count object when a last count object instance goes out of scope, wherein the object is a base object, the pointer object is a base pointer object, and the base object comprises a pointer object constructor, the steps further comprising:

instructions for deriving a derived object from the base object;

instructions for casting a second pointer object casted to the derived object;

instructions for attaching the second pointer object to the reference count object; and instructions for incrementing the reference count object.

20. The computer readable storage medium of claim 19, the steps further comprising:

instructions for deleting the base object and detaching the base pointer object from the reference count object; and instructions for decrementing the reference count object.

21. The computer readable storage medium of claim 19, the steps further comprising:

instructions for deleting the new object and detaching the new pointer object from the reference count object; and instructions for decrementing the reference count object.

22. The computer readable storage medium of claim 19, the steps further comprising:

instructions for deleting the base object and detaching the base pointer object from the reference count object;

instructions for decrementing the reference count object;

instructions for deleting the new object and detaching the new pointer object from the reference count object;

instructions for decrementing the reference count object; and instructions for deleting the reference count object.

\* \* \* \* \*

UNITED STATES PATENT AND TRADEMARK OFFICE
CERTIFICATE OF CORRECTION

PATENT NO. : 7,730,449 B2
APPLICATION NO. : 10/391828
DATED : June 1, 2010
INVENTOR(S) : Man M. Garg and Andrey I. Savov It is certified that error appears in the above-identified patent and that said Letters Patent is hereby corrected as shown below:

Col. 6 lines 49-67 and Col. 7 lines 1-15 in claim 12, please replace the claim as followed:

--12. A computer readable storage medium for encoding program code for managing an object, comprising:
    instructions for creating a reference count object;
    instructions for attaching the reference count object upon a first reference to an associated real object to a pointer object associated with the real object;
    instructions for directing a pointer lookup request to the reference count object in accordance with a location specified by a free pointer;
    instructions for incrementing a reference count value associated with the reference count object upon each occurrence of a reference to and a derivative of the real object;
    instructions for attaching a reference count object to each derivative of the real object;
    instructions for detaching each reference count object from each reference and to a derivative of the real object when it goes out of scope;
    instructions for decrementing the reference count value each time an instance of the reference count object goes out of scope; and
    instructions for deleting a final reference count object when a last count object instance goes out of scope, wherein the object is a base object, the pointer object is a base pointer object, and the base object comprises a pointer object constructor, the steps further comprising:
    instructions for deriving a derived object from the base object;
    instructions for casting a second pointer object casted to the derived object;
    instructions for attaching the second pointer object to the reference count object; and
    instructions for incrementing the reference count object.--

Signed and Sealed this

Twenty-seventh Day of July, 2010

David J. Kappos
*Director of the United States Patent and Trademark Office*